Feb. 12, 1957  J. B. BARTOW  2,781,042
APPARATUS AND METHOD FOR PRODUCING
AUTO-KINEMATIC-STEREOSCOPIC VISION
AND OPTICAL ILLUSIONARY EFFECTS
Filed May 29, 1953  3 Sheets-Sheet 1

Inventor:
John B. Bartow
by his Attorneys
Howson & Howson

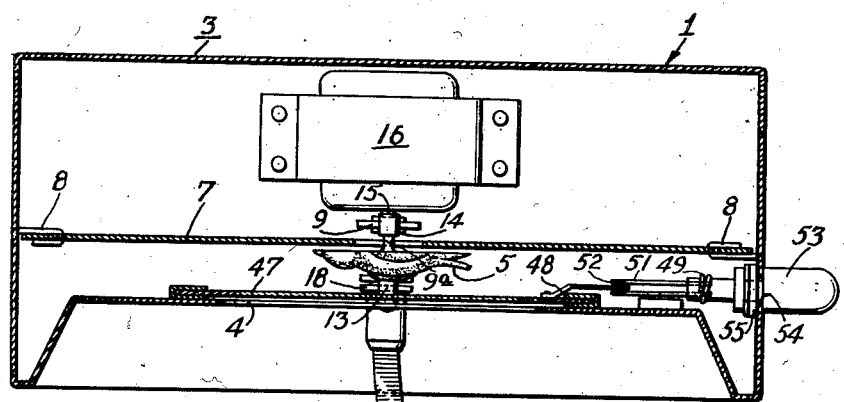
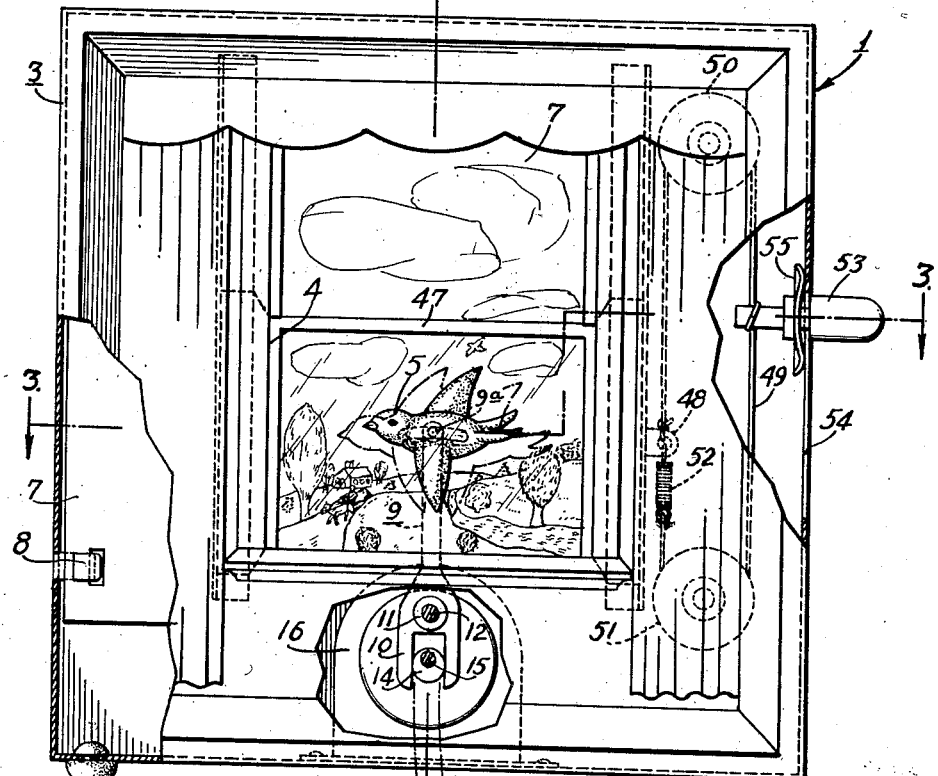

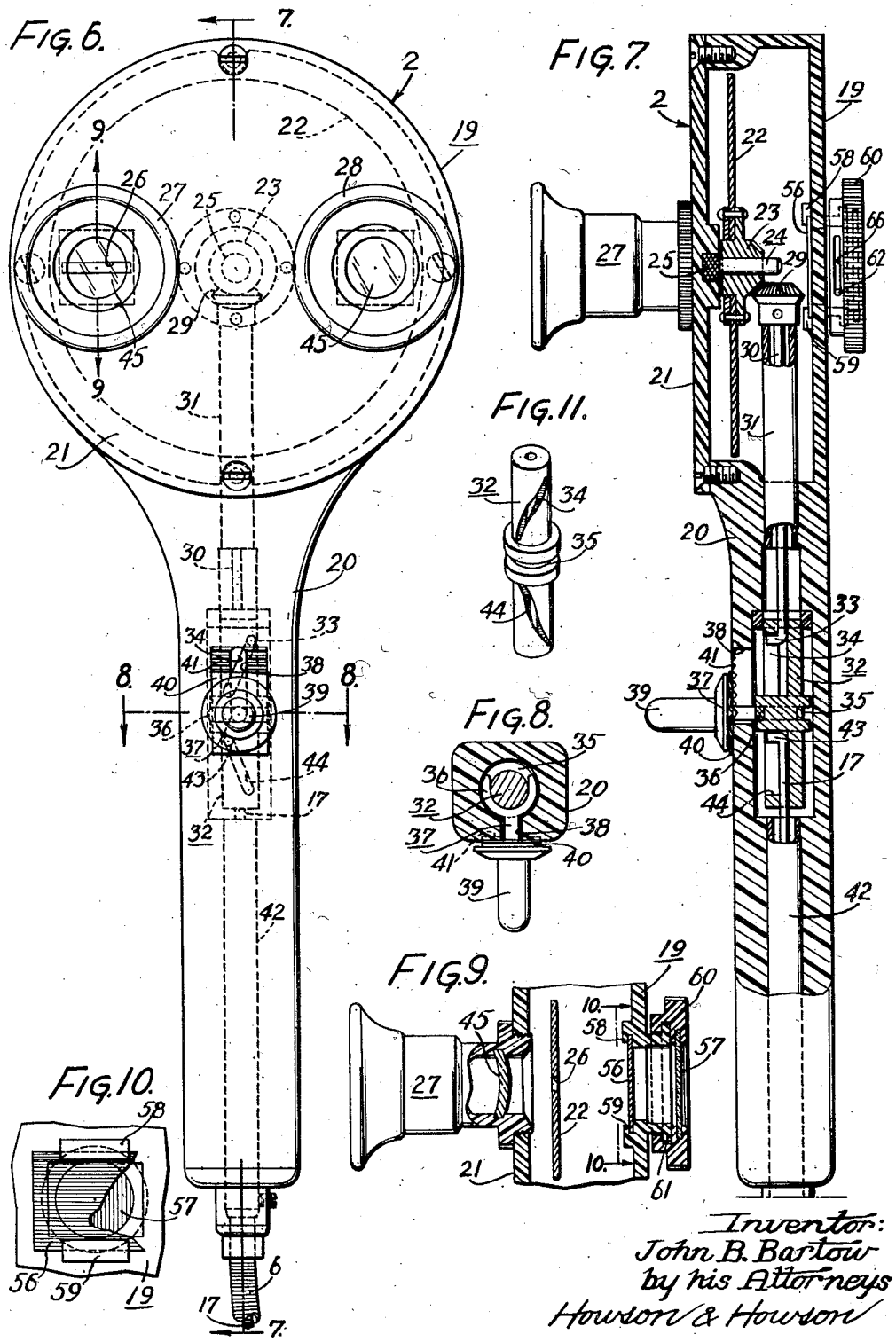

United States Patent Office 2,781,042
Patented Feb. 12, 1957

2,781,042

APPARATUS AND METHOD FOR PRODUCING AUTO - KINEMATIC - STEREOSCOPIC VISION AND OPTICAL ILLUSIONARY EFFECTS

John B. Bartow, Blue Bell, Pa., assignor to Bartow Beacons, Inc., Blue Bell, Pa., a corporation of Pennsylvania Application May 29, 1953, Serial No. 358,497

9 Claims. (Cl. 128—76.5)

This invention relates to devices and methods involving the viewing of an object in motion by an observer.

One object of the invention is to provide an apparatus and method by which an observer can tell whether, and to what degree, he or she has stereoscopic vision. To this end, stereoscopic viewing of an object is effected through cyclic oscillatory motion of the object and cyclic viewing of the object alternately by the eyes of the observer, and provision is made for changing the phase relation between the cyclic motion of the object and the cyclic viewing thereof. As described hereinafter, this enables testing of the observer for stereoscopic vision. Since the observer can test himself, and since the effects are produced by motion, it may be said that the invention produces auto-kinematic-stereoscopic vision.

Another object of the invention is to provide an apparatus and method by which optical illusionary effects may be produced.

A further object of the invention is to provide an apparatus and method which may be used for various purposes, such as amusement and eye training.

Other objects and features of the invention will be apparent from the following detailed description.

The invention may be clearly understood by reference to the accompanying drawings, in which:

Fig. 2 is a face view, on larger scale, of the device to be viewed, with portions broken away for illustration purposes;

Fig. 3 is a sectional view on line 3—3 of Fig. 2;

Fig. 6 is a front view, on relatively large scale, of the viewing device;

Fig. 7 is a sectional view on line 7—7 of Fig. 6;

Fig. 8 is a sectional view on line 8—8 of Fig. 6;

Fig. 9 is a sectional view on line 9—9 of Fig. 6;

Fig. 10 is a fragmentary view taken along line 10—10 of Fig. 9, with portions broken away for illustration;

Fig. 11 is a perspective view of the movable coupling member employed in the device for a purpose to be described.

Figure 1:
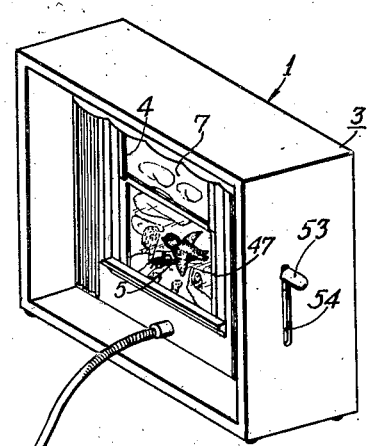
Fig. 1 is a perspective view of an apparatus embodying the invention.
Figure 5:
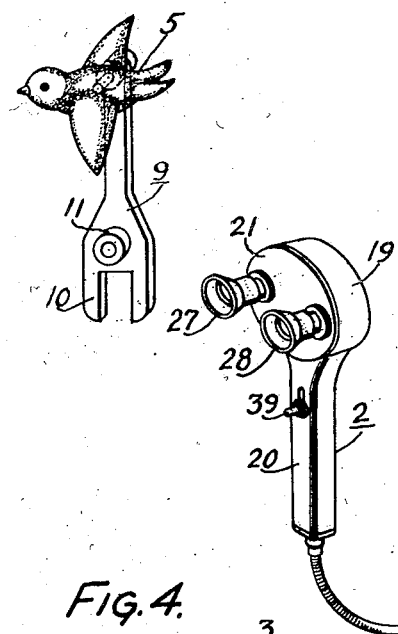
Fig. 5 is a perspective view of the member carrying the object to be viewed.
Figure 4:
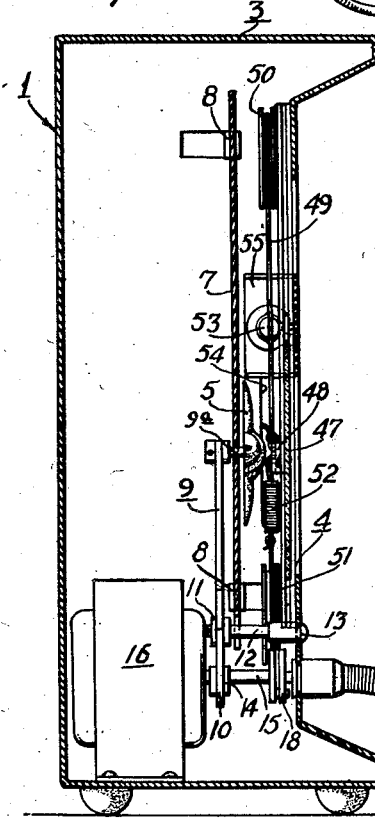
Fig. 4 is a sectional view on line 4—4 of Fig. 2.

Referring first to Fig. 1, the apparatus illustrated comprises a device 1 containing the object to be viewed and a viewing device 2 through which the observer views the object. In the form shown, the device 1 comprises a casing or housing 3 in which there is provided a window 4 through which an object 5 may be viewed. A flexible cable 6 extends between the two devices 1 and 2 for synchronous driving of movable members as hereinafter described.

Referring now to Figs. 2 to 5 which show the device 1 in detail, behind the window 4 and in spaced relation thereto, there is provided a planar member 7 on which appears a background as may be seen in Fig. 2. This member may be in the form of a sheet or board held within the casing 3 by means of supporting brackets 8. Between the background member 7 and the window 4 is the movable object 5. As may be clearly seen in Figs. 2 and 5, the movable object is in the form of a flying bird carried by a rocker arm 9 which has a bifurcated lower end 10 and which also has a mounting sleeve 11 through which a stationary stud or pin 12 extends. The stud 12 is secured to the front wall of the casing at 13, and the rocker arm is held on the stud by means of a cotter pin. Thus, the rocker arm 9 is free to oscillate on the stationary stud 12. As may be seen in Fig. 4, the arm 9 is disposed behind the background member 7 and it carries an object-supporting pin 9a which extends forwardly through a slot in the background member. An eccentric cam 14, mounted on the shaft 15 of a driving motor 16, engages the lower bifurcated end 10 of the rocker arm, so that rotation of shaft 15 effects rocking motion of arm 9 about the stationary stud 12 as an axis. Hence, the object 5 moves in a limited oscillatory motion in a plane between the window 4 and the background member 7.

The motor 16 also serves to drive a movable viewing member within the viewing device 2, as hereinafter described, and it is for this purpose that the flexible cable 6 is employed. The motion-transmitting shaft 17 within the cable 6 has one end coupled to the motor shaft at 18.

Referring now particularly to Figs. 6 and 7 which show the viewing device, this device comprises a casing 19 having a handle 20 and a removable front cover 21. Within the casing 19 is a rotatable disk 22 mounted on a hub 23 which is rotatably carried by a stud 24 fixedly secured to the cover 21 at 25. The disk 22 is provided with a viewing aperture or slot 26 which moves in a circular path as the disk rotates and in doing so moves successively and cyclically past a pair of eyepieces 27 and 28 carried by the cover 21 and disposed for viewing by the eyes of the observer.

The hub 23 for the viewing disk is provided with bevel gear teeth which mesh with bevel gear teeth of a driving pinion 29, the teeth being in a one-to-one ratio. The latter is secured to one end of a shaft element 30 extending within a stationary sleeve 31. The handle 20 is provided with a longitudinal bore to accommodate the lower part of sleeve 31 and also to accommodate other elements to be described. The lower end of shaft element 30 extends within a slidable coupling member 32 and is bent at 33 to project laterally into a slot 34 of the member 32. The slidable member has a central actuating portion 35 which is engaged by the bifurcated end 36 of a manually movable member 37 which moves in slot 38 of the handle. A flanged knob 39 is secured to member 37 to enable movement thereof. A detent plate 40 is also secured to member 37 and serves cooperatively with teeth 41 on the handle surface to retain the member 37 in any position of adjustment.

The flexible shaft 17 extends within the lower part of handle 20 inside a stationary sleeve 42, and the end portion of the flexible shaft extends into the slidable member 32 and is bent at 43 to extend laterally into a slot 44 of the member 32. The slots 34 and 44 are cam slots which, upon sliding movement of member 32, effect relative rotary displacement of shaft 17 and shaft element 30. The effect of this is to cause relative phase displacement between the object 5 and the viewing disk 22 in their respective operating cycles. It will be seen, therefore, that the member 32 is an adjustable coupler between shaft 17 and shaft element 30 through which the viewing disk 22 is driven in synchronism with the object, and adjustment of this coupler effects the relative phase displacement above mentioned.

Figure 12:
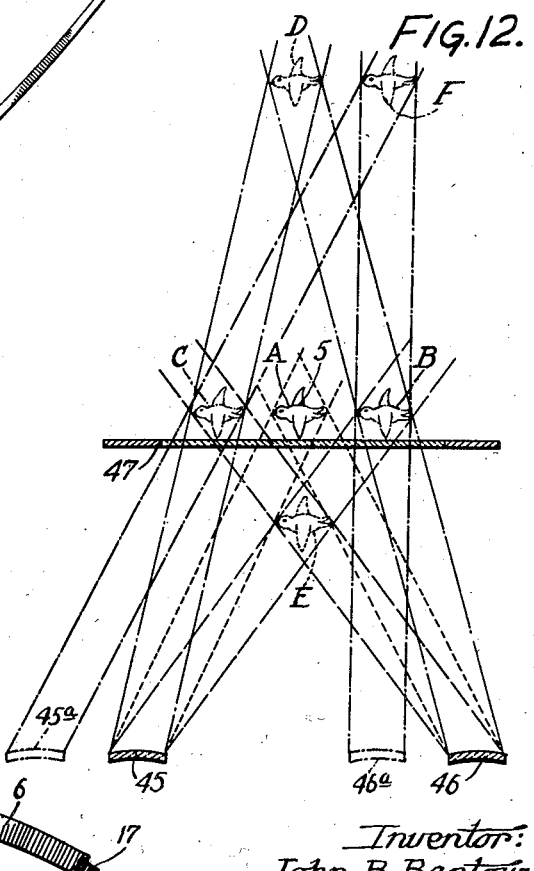
Fig. 12 is an explanatory illustration of the effects produced.

The operation of the apparatus and the steroscopic and optical illusionary effects produced thereby will now be explained with the aid of Fig. 12. Due to space limitation the proportions in Fig. 12 are not the actual proportions but it serves to illustrate the principles involved. The eyepiece lenses are represented at 45 and 46 where the eyes of the observer will be located. The object to be viewed oscillates from side-to-side just behind the window 4. The viewing disk (not shown in Fig. 12) makes one complete revolution for each complete oscillation of the object, and during each operating cycle each eye of the observer views the object in a definite position. The speed of operation is above the threshold of persistence of vision of the human eye, and, therefore, there is no flicker effect. Due to the stroboscopic action, each of the observer's eyes receives a stationary image of the moving object.

The position of the object at which each eye of the observer views it is dependent upon the time or phase relation between the cyclic motions of the object and the viewing disk, which relation is determined by the adjustment of the coupling member 32 as above-described. Moreover, the position of the image received by the observer in relation in the window 4 depends upon the time or phase adjustment. Referring to Fig. 12, if the time or phase relationship is such that both of the observer's eyes view the object 5 at position A, i. e. at the center position of the oscillatory movement of the object, the object will appear to the observer in its actual or true position with respect to the plane of the window 4. If the time or phase relationship is such that the right eye at 46 views the object in position B which is the extreme right-hand position of the oscillatory movement, and the observer's left eye at 45 views the object in position C, which is the extreme left-hand position of the oscillatory movement, the two images combine optically and the composite resultant image appears at D where the projection lines intercept. In this instance, the object 5 will appear to the observer to be considerably beyond the plane of window 4. If the time or phase relationship is such that the observer's right eye at 46 views the object at C, and the left eye at 45 views the object at B, the composite image will be located at E, and it will appear to the observer that the object is considerably in front of the window in proximity to the observer. Thus, by various adjustments of the adjustable coupler 32 the object may be caused to appear to assume various positions either inside or outside the window 4. Adjustment of the coupler 32 while viewing the object causes the object to appear to move either inside or outside the window.

An interesting and useful phenomenon is that as the stereoscopic image moves away from the observer it appears to get larger, and as it moves toward the observer it appears to get smaller. This is useful in testing the eyes as hereinafter descrived, as it precludes the possibility of deception with respect to fore and aft movement of the image.

A further illusionary effect is produced if the time or phase adjustment is such that the observer's eyes view the object in positions other than the center position A, and if the observer moves while viewing the object. The observer's movement causes the object to appear to move in response to the observer's movement. If the adjustment is such that the image appears beyond the plane of movement of the object, the image will move in a direction opposite the direction of movement of the observer. For example, if the image appears at D and if the observer moves to the left so that his eyes are at 45a and 46a, the left eye at 45a will view the object at C and the right eye at 46a will view the object at B, and the composite image will appear at F. If the time or phase adjustment is such that the image appears in front of the plane of movement of the object, for example at position E, movement of the observer will cause the image to move in the same direction as the direction of movement of the observer.

Since the illusion of movement of the object inside or outside the window 4 is created by varying the time or phase relationship between the cyclic movement of the object and the cyclic viewing by the observer's eyes, the illusion could be caused to take place automatically and continuously by slightly changing the ratio of gears 23 and 29 from the one-to-one ratio, for example, by providing an additional tooth on one of the gears. Then the object would automatically appear to move inside and outside the window 4 due to the fact that the time or phase relationship would change continuously.

In order further to enhance the device, particularly from the standpoint of appeal as a novelty or toy, the window 4 is provided with a lower movable transparent section 47 behind which the object 5 is disposed. This enables opening of the window to make more realistic the illusion of causing the bird to move into the room in which the observer is located. After the bird has seemingly been brought into the room, the window may be closed to trap the bird inside the room. However, if the observer attempts to catch the bird while viewing it, his fingers simply grasp the air as, of course, the ostensible presence of the bird within the room is merely an illusion. This, of course, is amusing to adults and is intriguing and mystifying to children.

In order to enable easy opening and closing of the window, the movable transparent section 47 is provided with a laterally extending finger 48 through which it is movable by a cord and pulley arrangement which may comprise the cord 49, pulleys 50 and 51, spring 52 and a knob 53 to which the cord is attached and which is movable in a slot 54 in the side of the casing. A spring disk 55 is attached to the knob and serves to hold it in place. By this arrangement, the movable window section 47 may be raised and lowered through vertical movement of the knob 53.

From the foregoing description it may be seen that stereoscopic viewing of the object by the observer is involved, since the observer's eyes view the object from different positions at different angles. Moreover, with any adjustment of the time or phase relation, the perspective views of the object by the observer's eyes are such that the stereoscopic composite of the object is in true relationship for its composite stereoscopic position relative to the observer.

As stated previously, the apparatus may be used for eye training, and it may be used to correct conditions which are quite prevalent. For example, it is well known that some persons unconsciously use only one eye, especially when one eye is stronger than the other. This frequently causes the other eye to wander. Such persons have poor or no stereoscopic vision, but this is a condition which usually can be corrected by means of eye exersise to effect coordination of the eye muscles. This can be accomplished by means of the present apparatus. In order to cause the object to appear to change its position fore and aft with respect to the window 4, it is necessary to view it with both eyes, and as the observer thus views the object while it appears to move toward and away from the observer, the eyes are given exercise which tends to coordinate the eye muscles and thus strengthen or improve the stereoscopic vision. In this connection, it should be noted that if the object is viewed unconsciously with only one eye as the adjustment of the coupler 32 is changed, the object merely appears to move sidewise. Thus the observer can tell whether he is viewing the object stereoscopically with both eyes.

In this same connection, it is possible for a person to tell whether, and to what degree, he or she has stereoscopic vision. Some persons have a limited range of fusion or coordination, which is necessary for stereoscopic vision; for example, one person may have it only for nearby objects, while another person may have it only for distant objects. The present apparatus can be used to test this and to apply correction. If the observer sees fore and aft movement of a single image throughout the range of adjustment of the coupler 32, he or she is not limited as to fusion; but if the image becomes two images either during forward movement or during rearward movement, the observer has only a limited range of fusion. To help correct this, the observer first determines the limit of the range of fusion, i. e. the limiting point at which a single image is seen. Then by moving the coupler slightly in the direction to move the image beyond that point, the eyes may be coaxed, so to speak, to move further in or out. Repeated exercise in this fashion strengthens and develops the eye muscles which are related to the control of the eyes for fusion.

It should be noted that the observer can easily tell when fusion is lost or when the brain rejects the image of one eye. Loss of fusion causes the observer to see two images, as mentioned above, and these images move sidewise in opposite directions instead of fore and aft. Rejection by the brain of the image of one eye causes the observer to see a single image moving sidewise instead of fore and aft.

In some eye training it will be helpful to be able to vary the light transmission to either of the observer's eyes. Referring to Fig. 9, each of the eyepieces has associated with it a stationary Polaroid element 56 and a rotatable Polaroid element 57. The Polaroid element 56 is held by supporting guides 58 and 59 formed integrally with the inner surface of the back wall of casing 19. The Polaroid element 57 is carried by a rotatable ring 60 which is rotatably supported by a flange 61 integral with the outer surface of the back of casing 19. As may be seen in Fig. 7, a pin 62 on flange 61 and a slot 66 in ring 60 serve to limit rotation of the Polaroid element 57 to 90°. When the polarizations of the elements 56 and 57 are parallel, light is freely transmitted to the observer's eye, but when the polarizations of the two elements are at right angles to one another, light transmission is almost completely cut off. Intermediate adjustments of the movable Polaroid element give varying degrees of light transmission.

By means of this arrangement, either eye of the observer can be screened, either partially or completely, and the other eye can be forced to function as it should. Thus, in the case of crossed eyes when one eye is not functioning properly, the other eye may be screened so that the delinquent eye will be forced to function, and then the properly functioning eye may be brought into use so that the observer is using both eyes. For example, if the right eye is the properly functioning eye, and if the light transmission to that eye is practically cut off by adjusting the movable Polaroid screen, and if the coupler 32 is adjusted so that the left eye views the object in position C (Fig. 12), the object appears to be in that position. Then, if the adjustable Polaroid screen for the right eye is rotated and the right eye also commences to see clearly, the object will no longer appear to be in position C but will appear to be in position D. Both eyes will then be functioning properly, and if the adjustment of coupler 32 is changed the eyes will cone in and out and function correctly, and the object will appear to move toward and away from the observer. If, at any time, the observer should unconsciously start to use only one eye, he will know it immediately as the object will then appear to move only sidewise as the adjustment of coupler 32 is changed. This training of the eyes is particularly important in the case of children, as they generally do not know what is meant by stereoscopic vision and do not know the difference between stereoscopic vision and lack of it. The present apparatus is useful in teaching them this difference. In this connection, it should be noted that a child at birth does not have coordination or fusion of the eyes, which is necessary for stereoscopic vision, and this must develop naturally or be developed by training. This development by training can be aided by the use of this apparatus.

The apparatus and method provided by this invention has numerous possibilities in regard to visual effects. Thus, the object and the background may be changed to other subjects and views. For example, the object might be in the form of a rocket ship and the background might represent the sky with its planets and stars. It is also possible to produce individual motion of some part of the object. For example, if the object were in the form of a dog with a flexible tail formed of rubber or the like, then the oscillatory motion of the dog would cause some motion of the tail and this would appear to the observer as a wagging motion of the tail due to the fact that the tail would be in different positions during successive viewings by the observer's eyes. It will be apparent that various other effects may be produced by means of the apparatus.

From the foregoing description, it will be seen that the present invention provides an apparatus which is useful for various purposes and which produces novel and unique results. While a particular form of the apparatus has been illustrated and described, the invention is not limited thereto but contemplates such modifications and other embodiments as may be utilized. For example, the apparatus may be constructed to permit change of the object and background at will. Also, the arrangement for driving the object and viewing device may be modified. Thus, it is possible to use two synchronous motors to drive the object and the viewing devide, and phase displacement may be effected by shifting the field of the synchronous motor at the viewing device. Various other possibilities will be apparent.

I claim:

1. Apparatus for producing stereoscopic visual effects, comprising: object means arranged for cyclic movement across a field or area to be viewed by an observer; cyclically-operable means for effecting successive viewings of said object means, first by one eye of the observer and then by the other eye of the observer; means for driving said object means and said viewing means in synchronism at a speed above the threshold of persistence of human vision, whereby successive viewings by the observer's eyes occur at different instants within the time interval of a movement cycle of said object means, and the observer's eyes receive images which combine optically and stereoscopically if the brain accepts and fuses the images received by both eyes; and means for changing the phase relation between the operating cycles of said object means and of said viewing means, whereby the observer is caused to see a single image moving toward or away from the observer if the object means is being viewed stereoscopically with both eyes, and the observer is caused to see two images moving sidewise if loss of fusion occurs or a single image moving sidewise if the brain rejects the image of one eye.

2. Apparatus according to claim 1, including means manually adjustable at will to vary the light transmission to either of the observer's eyes.

3. Apparatus according to claim 1, wherein said driving means comprises electric motor means and driving connections for driving said object means and said viewing means, and said phase changing means comprising mechanical displacement means in one of the driving connections.

4. Apparatus for producing stereoscopic visual effects, comprising: a casing; object means arranged within said casing for cyclic movement across a field or area to be viewed by an observer; cyclically-operable means for effecting successive viewings of said object means, first by one eye of the observer and then by the other eye of the observer; means for driving said object means and said viewing means in synchronism at a speed above the threshold of persistence of human vision, whereby successive viewings by the observer's eyes occur at different instants within the time interval of a movement cycle of said object means, and the observer's eyes receive images which combine optically and stereoscopically if the brain accepts and fuses the images received by both eyes; and means for changing the phase relation between the operating cycles of said object means and of said viewing means, whereby the observer is caused to see a single image moving toward or away from the observer if the object means is being viewed stereoscopically with both eyes, and the observer is caused to see two images moving sidewise if loss of fusion occurs or a single image moving sidewise if the brain rejects the image of one eye.

5. Apparatus according to claim 4, including means manually adjustable at will to vary the light transmission to either of the observer's eyes.

6. Apparatus according to claim 4, wherein said driving means comprises electric motor means and driving connections for driving said object means and said viewing means, and said phase changing means comprising mechanical displacement means in one of the driving connections.

7. Apparatus for producing stereoscopic visual effects, comprising: a casing having a window therein; object means within said casing adjacent said window arranged for cyclic movement across a field or area to be viewed by an observer; cyclically-operable means for effecting successive viewings of said object means, first by one eye of the observer and then by the other eye of the observer; means for driving said object means and said viewing means in synchronism at a speed above the threshold of persistence of human vision, whereby successive viewings by the observer's eyes occur at different instants within the time interval of a movement cycle of said object means, and the observer's eyes receive images which combine optically and stereoscopically if the brain accepts and fuses the images received by both eyes; and means for changing the phase relation between the operating cycles of said object means and of said viewing means, whereby the stereoscopic image is caused to move into or out of said window.

8. Apparatus according to claim 7, including means manually adjustable at will to vary the light transmission to either of the observer's eyes.

9. Apparatus according to claim 7, wherein said driving means comprises electric motor means and driving connections for driving said object means and said viewing means, and said phase changing means comprising mechanical displacement means in one of the driving connections.

References Cited in the file of this patent

UNITED STATES PATENTS

| | | |
|---|---|---|
| 495,822 | Meddins | Apr. 18, 1893 |
| 660,006 | Doyen | Oct. 16, 1900 |
| 1,488,327 | Duhem | Mar. 25, 1924 |
| 1,975,876 | Stern | Oct. 9, 1934 |
| 2,018,577 | Ruckelhaus | Oct. 22, 1935 |
| 2,224,775 | Bartow | Dec. 10, 1940 |

FOREIGN PATENTS

| | | |
|---|---|---|
| 514,532 | France | Nov. 16, 1920 |